United States Patent
Chang

(10) Patent No.: US 11,519,733 B2
(45) Date of Patent: Dec. 6, 2022

(54) AUTONOMOUS MOWER NAVIGATION SYSTEM AND METHOD

(71) Applicant: MTD PRODUCTS INC, Valley City, OH (US)

(72) Inventor: Her-Jye Chang, Zionsville, IN (US)

(73) Assignee: MTD PRODUCTS INC, Valley City, OH (US)

( * ) Notice: Subject to any disclaimer, the term of this patent is extended or adjusted under 35 U.S.C. 154(b) by 270 days.

(21) Appl. No.: 16/700,885

(22) Filed: Dec. 2, 2019

(65) Prior Publication Data
US 2020/0173784 A1 Jun. 4, 2020

Related U.S. Application Data

(60) Provisional application No. 62/774,315, filed on Dec. 2, 2018.

(51) Int. Cl.
| | |
|---|---|
| *G01C 21/20* | (2006.01) |
| *A01D 34/00* | (2006.01) |
| *G05D 1/00* | (2006.01) |
| *G05D 1/02* | (2020.01) |
| *A01D 101/00* | (2006.01) |

(52) U.S. Cl.
CPC .......... *G01C 21/20* (2013.01); *A01D 34/008* (2013.01); *G05D 1/0011* (2013.01); *G05D 1/0219* (2013.01); *G05D 1/0278* (2013.01); *A01D 2101/00* (2013.01); *G05D 2201/0208* (2013.01)

(58) Field of Classification Search
None
See application file for complete search history.

(56) References Cited

U.S. PATENT DOCUMENTS

| | | | |
|---|---|---|---|
| 5,944,132 A | 8/1999 | Davies | |
| 2002/0156556 A1 | 10/2002 | Ruffner | |
| 2005/0075784 A1* | 4/2005 | Gray | A01B 69/008 |
| | | | 701/25 |
| 2012/0265391 A1* | 10/2012 | Letsky | G05D 1/0221 |
| | | | 701/25 |
| 2017/0079202 A1 | 3/2017 | Balutis et al. | |

(Continued)

OTHER PUBLICATIONS

International Search Report and Written Opinion issued in International Application No. PCT/US2019/064051 dated Feb. 24, 2020; 14 pages.

*Primary Examiner* — Adam D Tissot
*Assistant Examiner* — Garrett F Evans
(74) *Attorney, Agent, or Firm* — Wegman Hessler

(57) ABSTRACT

A method for autonomous mower navigation includes performing a training operation for an area including identifying a GPS signal associated with a training apparatus, iteratively recording data associated geolocations of the training apparatus as the training apparatus moves along a trajectory through the area, smoothing the geolocation data associated with the trajectory, and storing the smoothed geolocation data. The method can include subsequent to the training operation, performing a greens association process including establishing a link between the autonomous mower and an RTK-GPS base, receiving by the autonomous mower correction data from the RTK-GPS base, and determining an approach angle to a work area, wherein the path the autonomous mower travels to the work zone is defined by the approach angle.

15 Claims, 5 Drawing Sheets

(56) References Cited

U.S. PATENT DOCUMENTS

| | | |
|---|---|---|
| 2017/0094897 A1 | 4/2017 | Balutis et al. |
| 2017/0102702 A1* | 4/2017 | Ishijima ............... G05D 1/0278 |
| 2017/0364088 A1* | 12/2017 | Grufman .............. G05D 1/0221 |
| 2018/0213731 A1 | 8/2018 | Wykman et al. |
| 2018/0321682 A1* | 11/2018 | Matsumoto ............. G01S 19/45 |

* cited by examiner

AUTONOMOUS MOWER NAVIGATION SYSTEM AND METHOD

CROSS REFERENCE TO RELATED APPLICATIONS

This application claims the benefit of U.S. Provisional Application No. 62/774,315, filed Dec. 2, 2018, the entire disclosure of which is incorporated herein by reference.

FIELD OF THE INVENTION

The disclosed systems and methods are directed to navigation, and more particularly, autonomous mower navigation systems and methods. In an aspect, the disclosed systems and methods are suitable for training of golf greens' perimeter shapes, keep-out zones, working zones and associating the trained data when deploying an autonomous device for operation.

BACKGROUND OF THE INVENTION

Conventional systems for robotic greens mowers utilize a local positioning system (LPS) which includes four beacons, and uses the system to localize the robot's pose. By driving the robot and recording the trajectory, an operator can train the greens' perimeter shapes and keep-out zones. This approach, however, requires beacons and is susceptible to ambiguities with regards to location. A beacon-base system uses the geometry pattern formed by the 4 beacons to perform the greens association, it has been identified that a symmetric shape or similar beacon patterns among other greens would lead to greens-association difficulties.

Thus, there remains a need for an accurate, efficient and cost-effective solution for autonomous mower navigation that does not require beacons, reduces ambiguities, and is easier to deploy and install.

BRIEF SUMMARY OF THE INVENTION

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

In an embodiment, a method for autonomous mower navigation includes performing a training operation for an area including identifying a GPS signal associated with a training apparatus, iteratively recording data associated geolocations of the training apparatus as the training apparatus moves along a trajectory through the area, smoothing the geolocation data associated with the trajectory, and storing the smoothed geolocation data.

In an embodiment, a method for autonomous mower navigation includes the keep out zone comprises an area adjacent to a golf green perimeter, and within which the autonomous mower is not intended to travel or operate.

In an embodiment, a method for autonomous mower navigation includes, wherein the training apparatus comprises one of an independent fixture or the autonomous mower.

In an embodiment, a method for autonomous mower navigation includes an association process for planning a path for execution of a mowing task by the autonomous mower based on the stored data.

In an embodiment, a method for autonomous mower navigation includes recording data associated geolocations of the training apparatus is terminated when a closed loop trajectory has been detected.

In an embodiment, a method for autonomous mower navigation includes subsequent to the training operation, performing a greens association process including, establishing a link between the autonomous mower and an RTK-GPS base, receiving by the autonomous mower correction data from the RTK-GPS base, and determining an approach angle to a work area, wherein the path the autonomous mower travels to the work zone is defined by the approach angle.

In an embodiment, a method for autonomous mower navigation includes the work zone comprises a golf green, the approach angle is based on an angle between north and a line extending from a tee box associated with the golf green and a hole position on the golf green.

In an embodiment, a method for autonomous mower navigation includes generating an autonomous mower travel path for a mowing task based on the greens association process and a current location of the autonomous mower.

In an embodiment, a method for autonomous mower navigation includes performing a mowing task based on the autonomous mower travel path.

In an embodiment, a method for autonomous mower navigation includes during performance of the mowing task, receiving RTK-GPS correction data from an RTK-GPS base, and adjusting the autonomous mower travel path based on the RTK-GPS correction data.

In an embodiment, a method for autonomous mower navigation includes stopping operation of the autonomous mower when a present location of the autonomous mower travels is outside the autonomous mower travel path.

In an embodiment, a method for autonomous mower navigation includes the geolocation data associated with the trajectory defines a golf green perimeter.

In an embodiment, a method for autonomous mower navigation includes the geolocation data associated with the trajectory defines a keep out zone that is located adjacent to the golf green perimeter.

In an embodiment, a method for autonomous mower navigation includes wherein during the training operation, the training apparatus follows multiple trajectories including a first trajectory associated with a golf green perimeter and a second trajectory associated a keep out zone that is located adjacent to the golf green perimeter, and a first set of geolocation data associated with the golf green perimeter is recorded, and a second set of geolocation data associated with a keep out zone that is located adjacent to the golf green perimeter is recorded.

In an embodiment, a method for autonomous mower navigation includes the autonomous mower comprises a robotic greens mower.

In an embodiment, a method for autonomous mower navigation includes the geolocation date comprises North east down coordinates.

In an embodiment, a method for autonomous mower navigation includes smoothing the geolocation data is performed by the autonomous mower or is performed by a server that is in communication with the autonomous mower and located remotely from the autonomous mower.

In an embodiment, a system for autonomous mower navigation includes a robotic golf greens mower, an RTK-GPS base for providing RTK-GPS correction data, a cloud based data processing service for processing geolocation data, one or more computer servers, one or more mobile devices, a data communications network for providing communications access between any of the RTK-GPS base, the mobile device, the cloud service, and the robotic greens mower, wherein the RTK-GPS correction data is processed by the cloud service and provided to the robotics greens mower via the data communications network.

In an embodiment, a system for autonomous mower navigation includes the RTK-GPS correction data is collected over a period of time and communicated via the mobile device to the cloud service for post processing, and the processed RTK-GPS correction data is communicated from the cloud service back to the mobile device, and then to the cloud server where it is deployed to the robotics greens mower.

In an embodiment, a system for autonomous mower navigation includes the RTK-GPS correction data is collected over a period of time of between five hours and 72 hours.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

Figure 1:
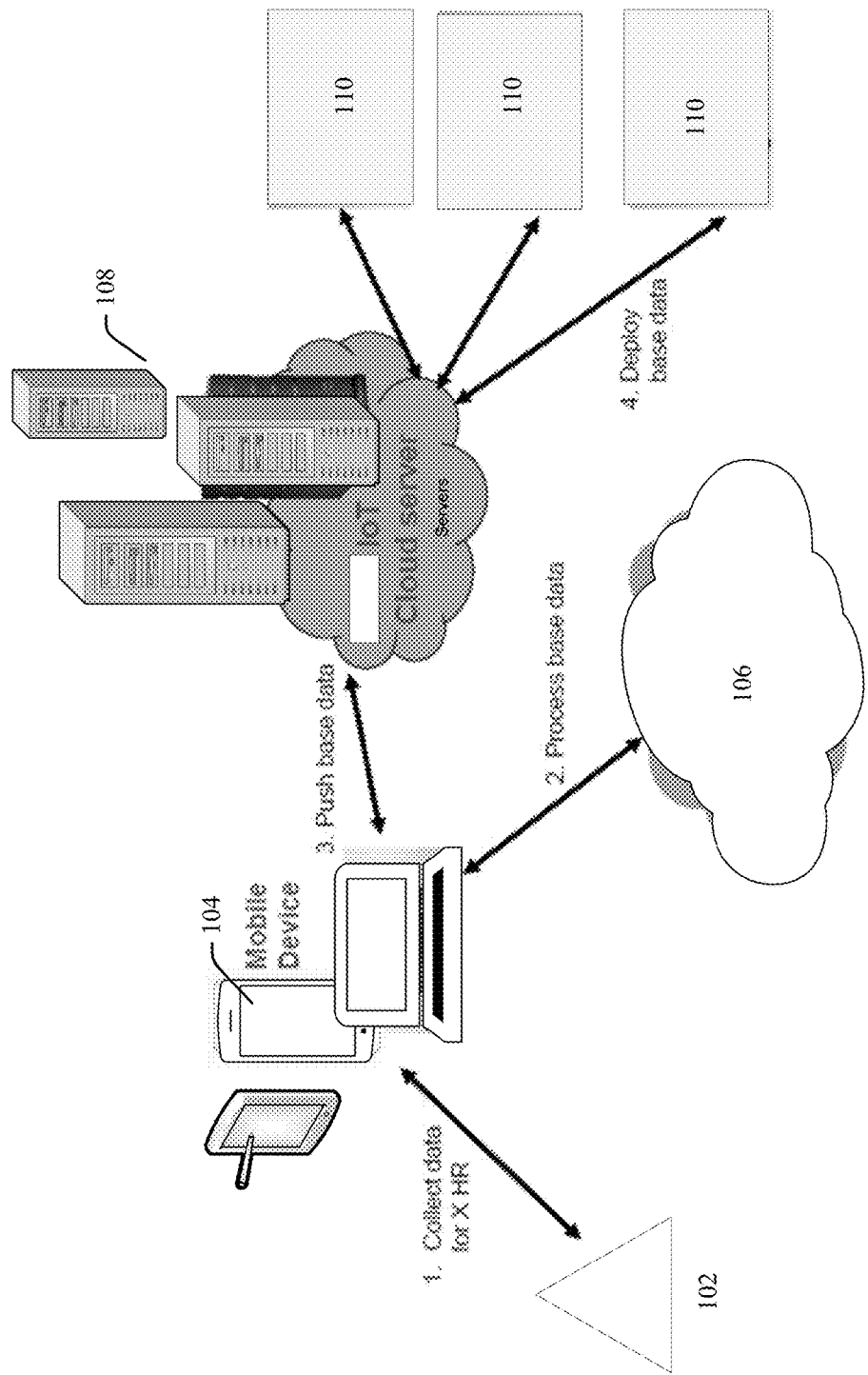
FIG. 1 is an illustration of an example system for autonomous mower navigation in accordance with an aspect of the disclosure.

It should be noted that all the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments. Accordingly, the drawings and description are to be regarded as illustrative in nature and not as restrictive.

DETAILED DESCRIPTION

The following terms are used throughout the description, the definitions of which are provided herein to assist in understanding various aspects of the subject disclosure.

As used herein, the terms "autonomous mower", "device", "turf device", "robotic mower", "vehicle" and "robot" refer to an autonomous robot, or most any autonomous device, vehicle or machine that performs various tasks and functions including lawn mowing, lawn maintenance, vacuum cleaning, floor sweeping and the like. Similarly, and as used herein, the terms "autonomous mower", "robotic mower", "vehicle", "turf device", "device" and "robot" are used interchangeably and refer to most any device, or machine, wherein the device or machine is not necessarily autonomous.

As used herein, the term "navigation" refers to confinement, or confining an autonomous mower to a work area, determining a location of a robotic mower in relation to a work area, localization, directing movement of an autonomous mower, ascertaining a position of an autonomous mower, and/or planning and following a route.

As used herein, the terms "golf green" or "greens" refer to a putting green of a golf course where the flagstick and hole are located. According to the Rules of Golf, the putting green is specially prepared ground for playing the golf ball along the ground surrounding the hole being played. Greens can vary widely in shape and size, and can be mostly round, oval or oblong in shape.

As used herein, the term a "Keep-Out Zone" (KOZ) is intended to define a zone where the autonomous device shall not enter when operating. In an embodiment, the KOZ is an area defined by a loop which lies outside a greens perimeter, or other area where the autonomous device is not intended to operate.

As used herein a work zone is an area within which the autonomous device operates. Upon leaving the work zone, the autonomous device ceases operation, and is disabled. In an embodiment, the work zone is defined as a larger area, which can include several or all greens of a golf course. This behavior and the defined work zone are intended to prevent the autonomous device from entering into a street, or other non-work area, and from leaving the autonomous device's designated working course, for example, for safety reasons.

The term greens association is used to describe a process by which an autonomous device is deployed to a golf green for operation. The autonomous device receives data associated with its current location and the golf green it is intended to operate on. The autonomous device can generate and plan a proper task and paths to execute the operation.

In an embodiment, an approach angle is the angle between the Earth north direction and a line of a tee box to the hole position on a golf green. Using a compass, the Earth north direction would set a bearing or azimuth of 0° or 360°.

In an embodiment, a geographic location refers to a position on the Earth. The absolute geographic location can be defined by two coordinates, longitude and latitude.

In an embodiment, the North east down (NED) location, also known as the local tangent plane (LTP), is a geographical coordinate system for representing state vectors that is commonly used in aviation. The (NED) location includes three numbers: one represents the position along the northern axis, one along the eastern axis, and one represents vertical position. The term "down" is chosen as opposed to up in order to comply with the right-hand rule. The origin of this coordinate system is usually chosen to be the RTK-GPS base.

As with lawn grass, the putting green grass variety generally suits the climate or region in which it is located. Creeping bent grass, a cool-season grass that thrives in northern climates, is widely considered the best for premium putting greens. The finely textured blades allow balls to roll easily, with less resistance, for smooth, fast play.

In hot southern climates, hybrid Bermudagrasses, or a mixed stand of bent grass and bermudagrass, provide good performance. The stiff, upright leaves allow good ball movement; the ball moves across the cut tips, unimpeded by soft, bending blades.

In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

The disclosed technology addresses the problem of how to use a precise GPS system to train a greens perimeter shape, keep-out zones and work zones for an autonomous device or robotic greens mower.

In addition, when the autonomous device is deployed on a green in a daily operation, the autonomous device can associate the deployed location with the trained green's data. The autonomous device can then start an operation with proper planned path and services.

Known robotic greens mowers generally utilize a local positioning system (LPS) which includes 4 beacons, and uses the system to localize a robot's pose. By driving the robot and recording the trajectory, an operator can train the greens' perimeter shapes and keep-out zones. It also supports the association functionality when the robot is deployed on a green for an operation. This approach, however, requires beacons. The disclosed technology utilizes the RTK-GPS system and does not require beacons, which is much easier to deploy and install.

The greens association is also much faster with less ambiguity since a beacon-base system uses the geometry pattern formed by the 4 beacons to perform the greens association, it has been identified that a symmetric shape or similar beacon patterns among other greens would lead to greens-association difficulties. When using geographic locations to perform greens association, since the location is unique, there is no ambiguity and the green can be identified much more quickly.

In aspects, the disclosed technology includes a greens training process including the following components: a robotic green mower or a RTK-GPS training device, an RTK-GPS base, and a controller (wireless or wired) configured to control the motion of the robotic greens mower. RTK-GPS base can include a Real Time Kinematic technique used to increase the accuracy of GPS signals by using a fixed base station which wirelessly sends out corrections to a moving receiver.

Referring to FIG. 1 a GPS base installation having a cloud method for processing data can include
1. Collecting data for 5 to 72 hours; data communication between the RTK-GPS base 102 and one or more mobile devices 104.
2. Processing base data: data communication between the mobile devices 104 and a data post-processing program or cloud service 106.
3. Push base data: data communication between the mobile devices and the cloud server(s) 108.
4. Deploy base data: communication between the cloud service 106 and the autonomous mower(s) 110.

The following steps outline an example Greens Perimeter/Keep Out Zone (KOZ) Cloud based training process in accordance with the disclosed system and method:
1. Create golf course.
2. Create golf green.
3. Obtain golf green geo-NED-locations.
4. Initiate and show perimeter capture.
5. Smooth data.
6. Repeat steps 4-5 for KOZ (KOZ capture multiple times to get slopes).
7. Validate data—on-autonomous device path checking.
8. Perform test runs.
9. Edit perimeter and KOZ if needed and re-run step 7-8.
10. Enter approach angle (ex. Google Map).
11. Push course and green data.
12. Validate greens data—automated path checking.
13. Edit perimeter and KOZ if needed.
14. Deploy course and greens data to appropriate autonomous devices 110.

Figure 3:
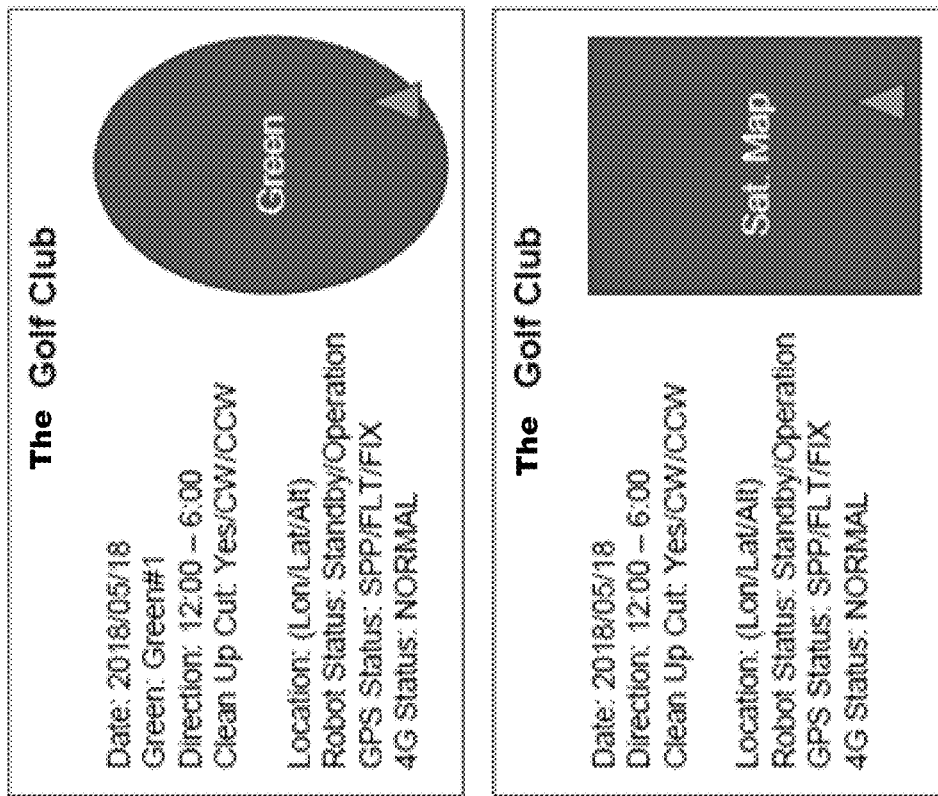
FIG. 3 is an illustration of an example data table for a system for autonomous mower navigation in accordance with an aspect of the disclosure.

As illustrated in FIG. 3, an example format for a greens operation can include the following information:
Golf Club: Course Name.
Date: Current Date.
Green: The associated greens' name or other indicator.
Direction: The mowing direction of the autonomous mower.
Clean Up Cut: Yes/CW/CCW: The selected clean-up cut operation. Yes: Clean-up cut will be performed. CW: Perform clean-up cut in clockwise direction, CCW: Perform clean-up cut in counter-clockwise direction. A clean up cut can include an edge trimming operation performed by the autonomous mower which follows along the edge of the work area.
Location: (Lon/Lat/Alt): Geographic location of the autonomous device.
Autonomous device status: Standby/Operation: The current status of the autonomous device.
GPS status: SPP/FLT/FIX: The GPS status can be indicated in SPP: Single Point Positioning Mode, FLT: The RTK-GPS floating mode, and/or FIX: The RTK_GPS fixed mode.
4 G status: Normal, is an indication of the 4 G or cellular network connection status.

Still referring to FIG. 1, an RTK-GPS Base 102 can be installed, for example, at a maintenance shop, a club house or other outdoor structure that has a clear sky view to the intended work area.

The RTK-GPS base 102 can include two antennas. The first antenna is the GPS antenna, which should be mounted at the top of a building or other structure with a clear sky view. The second antenna is a communication antenna, which is used to transmit the GPS correction data to the autonomous device. The links can be 4 G LTE, a radio link, a WiFi network, or most any other means of communication between the autonomous device and the base station. The communication antenna can be installed at the top of a building or just nearby the base module.

Once the antennas are installed, a precise geographic location survey of the base is obtained. The process can include locating a benchmark or monument in the field area to set up a base station. Local, state and government agencies, transportation departments (i.e. Caltrans), USGS, and the National Geodetic Survey maintain benchmarks or monuments. Another way to obtain a geographic location of an RTK-GPS base is surveyed by averaging a data set for more than about 5 to 72 hours or so when the satellites constellations have been fully changed.

Figure 2:
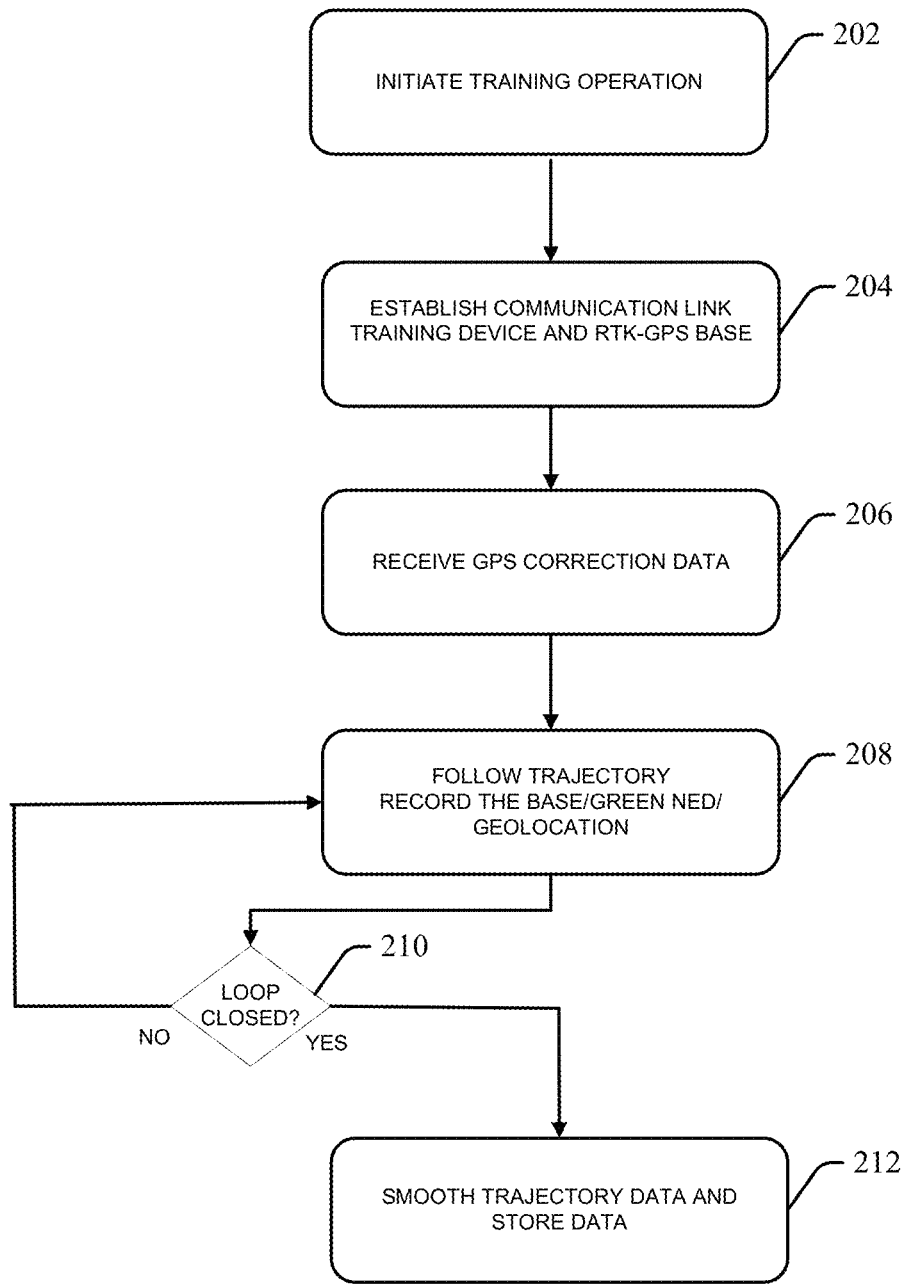
FIG. 2 is an example flow chart of operations for autonomous mower navigation with an aspect of the disclosure.

Referring to FIG. 2, an example greens training method 200 for an utilizing an autonomous device 110, or a training fixture, is illustrated. The autonomous device 110 (or other mobile training device or fixture) is deployed on a golf green that is to be trained. A user can enter data associated with the course/greens name. In an embodiment, a menu option can be selected to initiate the training process, and a training green, KOZ or work zone may be displayed.

An operator can begin a greens training process 200, for example, by pressing a training button/icon on a remote controller associated with the autonomous device 110 at step 202. The autonomous device 110 can identify that it has a fixed RTK-GPS location (e.g., having sub-centimeter accuracy), and is ready for greens training.

At step 204, the autonomous device 110 and the RTK-GPS base 102 establish a communication link, and the autonomous device 110 receives GPS correction data from the RTK-GPS base 102 at step 206.

At step 208 autonomous device 110 moves about the perimeter of the intended work area as data associated with its trajectory is collected by the system.

For example, the autonomous device 110 or the training device is driven or caused to move to follow the contour of a greens perimeter, KOZ and/or work zone. The system or training program can recognize when movement of the autonomous device 110 or the training device has completed or closed a loop around the greens perimeter, KOZ and/or work zone, for example at step 210, and can stop recording the trajectory.

Upon completion of the training trajectory, the system smooths the trajectory of the collected GPS data or traces and stores the processed data at step 212. Smoothing of the trajectory data can be accomplished using known smoothing algorithms and techniques. For example, an approximating function that attempts to capture important patterns in the data, while leaving out noise or other fine-scale structures/rapid phenomena.

If the training is interrupted or a glitch occurs, the training program allows a user to clear the data and re-start the training while tracking the greens perimeter/KOZ/work zone. This can save time to re-start and goes through the initialization process again.

The output data format of the greens perimeter/KOZ/work zone can include the following information: the RTK-GPS base location, the greens perimeter/KOZ/work zone geographic locations, the NED coordinates, the approach angle to the green, and geographic coordinates of the greens perimeter/KOZ/work zone.

Figure 4B:
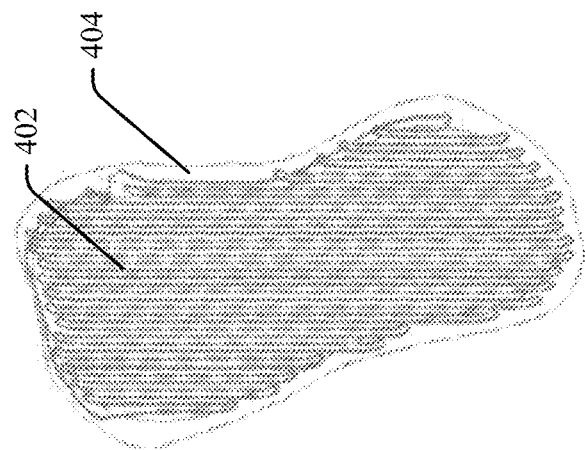
FIGS. 4A and 4B are illustrations of example greens training data and operation result example in accordance with an aspect of the disclosure.
Figure 4A:

An example output is shown in FIG. 4A where an indication of the intended work zone 402 and the KOZ 404 areas are illustrated, and also below in xml format as "Trained greens perimeter data of pro-practice green 2 in xml format".

The greens association process follows the greens training process. The autonomous device and the RTK-GPS base again establish a communication link that enables the autonomous device to receive the GPS correction data from the RTK-GPS base.

To start an operation, the autonomous device uses the correction data from the RTK-GPS base to obtain the geographic location of the autonomous device.

The autonomous device reads the greens data for intended work area of the applicable golf course. By comparing the autonomous device's current location and the geographic locations of golf greens, the autonomous device can determine the distance to each green. In an embodiment, the autonomous device selects the closest green, and checks whether it is within a threshold range (ex. 100 meter). If so, the autonomous device determines whether the autonomous device is within a KOZ. If the checks passed, the association is successful.

The autonomous device can request that the operator confirm the operation by showing the name of the associated green, and allows the operator to start an operation.

The autonomous device uses the greens perimeter and KOZ to plan the paths for the operation and starts the operation.

Referring to FIG. 4B, a successful association and mowing operation result is shown where the travel or mowing path of the autonomous device within the work zone is illustrated by the parallel lines. It can be seen that the autonomous device has travelled within the work zone with minimal overlap or intrusion into the KOZ.

Figure 5:
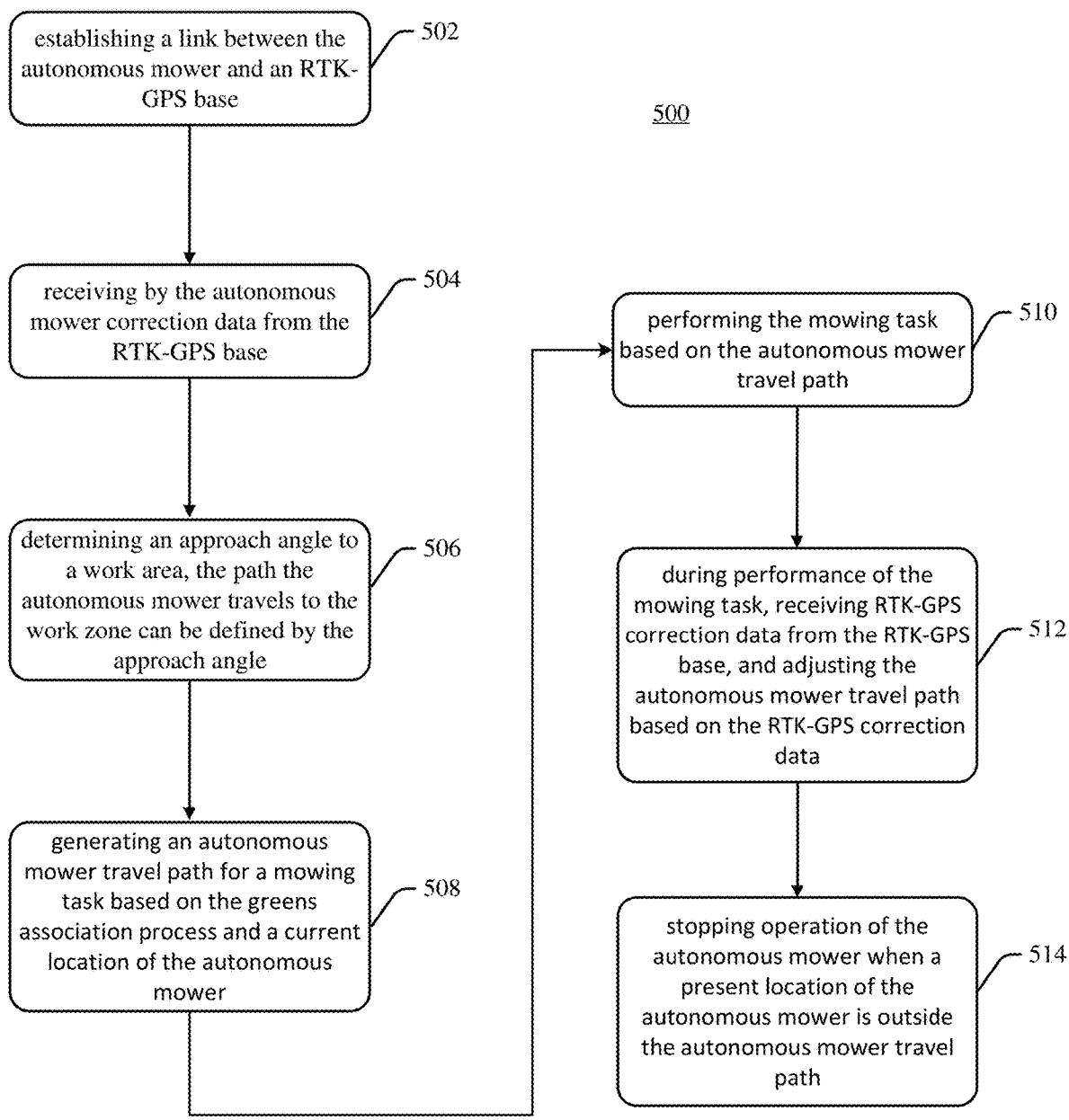
FIG. 5 is an example flow chart of operations for autonomous mower navigation in accordance with aspects of the disclosure.

With reference to FIG. 5, a method for autonomous mower navigation can include a greens association process 500 which follows the greens training process 200. At step 502, the autonomous device and the RTK-GPS base establish a communication link that enables the autonomous device to receive the GPS correction data from the RTK-GPS base.

At step 504, the autonomous mower receives correction data from the RTK-GPS base. To start an operation, the autonomous device uses the correction data from the RTK-GPS base to obtain the geographic location of the autonomous device.

At step 506, an approach angle to a work area is determined, and the path the autonomous mower travels to the work zone is defined by the approach angle.

At step 508, an autonomous mower travel path is generating for a mowing task based on the greens association process and a current location of the autonomous mower.

At step 510, a mowing task is performed based on the autonomous mower travel path.

At step 512, during performance of the mowing task, RTK-GPS correction data is received from the RTK-GPS base, and autonomous mower travel path can be adjusted based on the RTK-GPS correction data.

At step 514, operation of the autonomous mower is stopped when a present location of the autonomous mower is outside the autonomous mower travel path.

Greens Training Process and Greens Association

A greens training process can include a survey process to obtain a defined working space, and its geographic location. The autonomous mower can later utilize the data to associate with the mower's location, to plan mowing paths, to navigate through the space, and to stop an operation if detecting a violation of the working space.

In an example embodiment, training data can include:
GPS base location and pairing info,
golf course name,
golf greens name,
greens location,
greens perimeter,
greens keep-out zone boundary,
greens approach angle, and
good region to start operation.

In an embodiment, a process for GPS Base Installation and Survey can include the acts of:
installing a GPS base and antenna;
after installing the GPS base, collecting data for a time period, for example, a 5 to 72 hours data collection period is completed. The data can be stored, for example, as standard NMEA logs; and
post processing the data to obtain the base's geographic location.

A training tool (e.g., iOS/PC) can be utilized to push the processed base geographic coordinate to the RTK-GPS base, cloud data server, and the autonomous device.

A greens training operation can be accomplished in several ways, utilizing various training equipment. An independent fixture, or an autonomous device can be utilized as detailed below.

An independent fixture, for example, a fixture mounted on a walk-behind mower or other movable device can be used to collect data. Utilizing an independent fixture for training can make it easier to test and train a green before full deployment, and the training process can be faster than training with an autonomous device. By driving or moving the fixture to follow a greens perimeter, a KOZ, and or/a work zone. The geographic location data is collected to generate the greens perimeter file, KOZ files, and work zone data files.

Alternatively, a robot, an autonomous mower, or other autonomous device can be used to collect data. Utilizing an autonomous device for training requires no needs of a specialized fixtures. By driving the autonomous device to follow a greens perimeter/KOZ/work zone, the geographic location data is collected to generate the greens perimeter file, KOZ files, and work zone files.

In embodiments, sensors can be utilized to gather data concerning the greens perimeter/KOZ/work zone geographic location data.

The additional sensors can be included in the body or structure of the of a training fixture, an autonomous device 102, can be remote to the autonomous device 102, or can be located within a work area, or remote to the work area. For example, data can be obtained from rotational encoders, tachometer, gyroscope, accelerometers, inertial measurement unit, odometer, velocity meter, global positioning system (GPS), Light Detection and Ranging (LIDAR), ultra-wideband radar, beaconing systems, Global System for Mobile Communications (GSM) localization, or most any other systems and sensors, and can be combined with data received via sensors included on a training fixture, or the autonomous device 102.

A processing component associated with the disclosed navigation system and method for an autonomous mower includes hardware, software, and/or firmware components configured to receive, sample, filter, convert, process and use data, for example, data associated with the geographic location data that is collected and used to generate the greens perimeter files, KOZ files, and work zone files, and other sensors and inputs.

In an embodiment, the processing component includes a microprocessor, data processing hardware and software, memory, and other associated hardware, software and algorithms for autonomous device navigation. The processing component can perform operations associated with analog to digital signal conversion, signal sampling, signal filtering, execution of the disclosed algorithms, and other algorithms, evaluation of data, information determination, location determination, and most any other function related to the disclosed navigation system and method for an autonomous mower.

The disclosed navigation system and method for an autonomous mower can be implemented as "computer readable instructions", algorithms and/or modules for execution by the processing component. Computer readable instructions can be provided as program modules, such as functions, objects, Application Programming Interfaces (APIs), data structures, and the like, that perform particular tasks or implement particular abstract data types.

Example of Trained Greens Perimeter Data

| The trained greens perimeter data of pro-practice green 2 in xml format - pro_2.xml |
| --- |

```
<green>
    <gps_geo_green latitude="26.074673" longitude="-81.730414" altitude ="-25.986953" />
    <gps_geo_base latitude="26.073427" longitude="-81.726601" altitude="-20.213953" />
    <gps_ned_green north="0.000000" east="0.000000" down="0.000000" angle="0.000000" />
    <common type="float" key="approach_angle" value="60.0" />
    <point x="-378.353900" y="140.122400" />
    <point x="-377.480900" y="137.980100" />
    <point x="-376.706700" y="136.306400" />
    <point x="-376.199300" y="135.347600" />
    <point x="-375.314900" y="133.736700" />
    <point x="-374.908300" y="132.893300" />
    <point x="-374.385000" y="131.544500" />
    <point x="-373.934300" y="130.191100" />
    <point x="-373.682400" y="129.260300" />
    <point x="-373.445100" y="128.088100" />
    <point x="-372.716400" y="124.462700" />
    <point x="-372.513000" y="123.674500" />
    <point x="-372.247200" y="122.930000" />
    <point x="-372.101900" y="122.617400" />
    <point x="-371.827300" y="122.208400" />
    <point x="-371.478400" y="121.808300" />
    <point x="-371.093000" y="121.469300" />
    <point x="-370.827200" y="121.291700" />
    <point x="-370.370100" y="121.087800" />
    <point x="-369.852500" y="120.926800" />
    <point x="-369.319200" y="120.848900" />
    ...
</green>
```

Example of Trained KOZ Data

| The trained greens keep-out data of pro-practice green 2 in xml format - pro_2_keepout.xml |
|---|
| <green><br>    <gps_geo_green latitude="26.074617" longitude="−81.730376" altitude="−25.850055" /><br>    <gps_geo_base latitude="26.073427" longitude="−81.726601" altitude="−20.213953" /><br>    <gps_ned_green north="0.000000" east="0.000000" down="0.000000" angle="0.000000" /><br>    <beacon id="50" x="−397.916000" y="118.804000" /><br>    <beacon id="51" x="−397.916000" y="158.804000" /><br>    <beacon id="52" x="−357.916000" y="158.804000" /><br>    <beacon id="53" x="−357.916000" y="118.804000" /><br>    <point x="−376.833200" y="134.092400" /><br>    <point x="−376.261400" y="132.211300" /><br>    <point x="−375.869800" y="130.623000" /><br>    <point x="−375.473800" y="129.289100" /><br>    <point x="−375.350400" y="128.716100" /><br>    <point x="−375.131900" y="127.513300" /><br>    <point x="−374.854300" y="126.127600" /><br>    <point x="−374.597900" y="124.564600" /><br>    <point x="−374.183700" y="122.860100" /><br>    <point x="−373.937600" y="122.217900" /><br>    <point x="−373.575100" y="121.335700" /><br>    <point x="−373.367700" y="120.935100" /><br>    <point x="−373.067300" y="120.562500" /><br>    <point x="−364.540900" y="120.412300" /><br>    <point x="−363.330800" y="121.394200" /><br>    <point x="−362.970200" y="121.756500" /> |

While, for purposes of simplicity of explanation, the methodology illustrated in FIG. 2 is shown and described as a series of acts or steps, it is to be understood and appreciated that the subject disclosure is not limited by the order of acts or steps, as some acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts or steps may be required to implement a methodology in accordance with the disclosure.

While embodiments of the disclosed autonomous mower navigation system and method have been described, it should be understood that the disclosed autonomous mower navigation system and method are not so limited, and modifications may be made without departing from the disclosed autonomous mower navigation system and method. The scope of the autonomous mower navigation system and method are defined by the appended claims, and all devices, processes, and methods that come within the meaning of the claims, either literally or by equivalence, are intended to be embraced therein.

The invention claimed is:

1. A method for autonomous mower navigation, comprising:
   performing a training operation for a work area comprising a golf green, the training operation comprising;
   identifying a GPS signal associated with a training apparatus;
   iteratively recording data associated geolocations of the training apparatus as the training apparatus moves along a trajectory through the area;
   smoothing the geolocation data associated with the trajectory;
   storing the smoothed geolocation data; and
   subsequent to the training operation, performing a greens association process comprising,
   establishing a link between the autonomous mower and an RTK-GPS base;
   receiving by the autonomous mower correction data from the RTK-GPS base; and
   determining an approach angle to the golf green, wherein the path the autonomous mower travels to the golf green is defined by the approach angle, and wherein the approach angle is based on an angle between north and a line extending from a tee box associated with the golf green and a hole position on the golf green.

2. The method for autonomous mower navigation of claim 1, wherein a keep out zone comprises an area adjacent to a golf green perimeter, and within which an autonomous mower is not intended to travel or operate.

3. The method for autonomous mower navigation of claim 1, wherein the training apparatus comprises one of an independent fixture or an autonomous mower.

4. The method for autonomous mower navigation of claim 1, comprising:
   an association process for planning a path for execution of a mowing task by an autonomous mower based on the stored data.

5. The method for autonomous mower navigation of claim 1, wherein recording data associated geolocations of the training apparatus is terminated when a closed loop trajectory has been detected.

6. The method for autonomous mower navigation of claim 1, comprising generating an autonomous mower travel path for a mowing task based on the greens association process and a current location of an autonomous mower.

7. The method for autonomous mower navigation of claim 6, comprising performing the mowing task based on the autonomous mower travel path.

8. The method for autonomous mower navigation of claim 6, comprising during performance of the mowing task, receiving RTK-GPS correction data from the RTK-GPS base, and adjusting the autonomous mower travel path based on the RTK-GPS correction data received during performance of the mowing task.

9. The method for autonomous mower navigation of claim 6, comprising stopping operation of the autonomous mower when a present location of the autonomous mower is outside the autonomous mower travel path.

10. The method for autonomous mower navigation of claim 1, wherein the geolocation data associated with the trajectory defines a golf green perimeter.

11. The method for autonomous mower navigation of claim 10, wherein the geolocation data associated with the trajectory defines a keep out zone that is located adjacent to the golf green perimeter.

12. The method for autonomous mower navigation of claim 1,
wherein during the training operation, the training apparatus follows multiple trajectories including a first trajectory associated with a golf green perimeter and a second trajectory associated with a keep out zone that is located adjacent to the golf green perimeter; and
wherein a first set of geolocation data associated with the golf green perimeter is recorded, and a second set of geolocation data associated with the keep out zone that is located adjacent to the golf green perimeter is recorded.

13. The method for autonomous mower navigation of claim 1, wherein the autonomous mower comprises a robotic greens mower.

14. The method for autonomous mower navigation of claim 1, wherein the geolocation date comprises North east down coordinates.

15. The method for autonomous mower navigation of claim 1, wherein smoothing the geolocation data is performed by the autonomous mower or is performed by a server that is in communication with the autonomous mower and located remotely from the autonomous mower.

* * * * *